United States Patent
Baker et al.

(10) Patent No.: US 7,231,467 B2
(45) Date of Patent: Jun. 12, 2007

(54) METHOD AND APPARATUS FOR PROVIDING AN INTER INTEGRATED CIRCUIT INTERFACE WITH AN EXPANDED ADDRESS RANGE AND EFFICIENT PRIORITY-BASED DATA THROUGHPUT

(75) Inventors: Thomas E. Baker, Wernersville, PA (US); Laurence Edward Bays, Allentown, PA (US); Tony S. El-Kik, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 205 days.

(21) Appl. No.: 10/715,746

(22) Filed: Nov. 17, 2003

(65) Prior Publication Data

US 2005/0108454 A1  May 19, 2005

(51) Int. Cl.
*G06F 3/00* (2006.01)

(52) U.S. Cl. .......................... 710/9; 710/110

(58) Field of Classification Search .................. None
See application file for complete search history.

(56) References Cited

U.S. PATENT DOCUMENTS

| | | | | |
|---|---|---|---|---|
| 4,209,838 A | * | 6/1980 | Alcorn et al. | 710/119 |
| 4,715,031 A | * | 12/1987 | Crawford et al. | 370/462 |
| 5,444,847 A | * | 8/1995 | Iitsuka | 710/107 |
| 5,524,253 A | * | 6/1996 | Pham et al. | 709/202 |
| 5,530,436 A | * | 6/1996 | Tabib et al. | 340/825.52 |
| 5,559,502 A | * | 9/1996 | Schutte | 340/825.21 |
| 6,260,127 B1 | * | 7/2001 | Olarig et al. | 711/167 |
| 6,353,908 B1 | * | 3/2002 | Heinrich | 714/748 |
| 6,356,951 B1 | * | 3/2002 | Gentry, Jr. | 709/250 |
| 6,427,216 B1 | | 7/2002 | El-Kik et al. | |
| 6,449,289 B1 | * | 9/2002 | Quicksall | 370/475 |
| 6,467,065 B1 | * | 10/2002 | Mendez et al. | 714/800 |
| 6,510,484 B1 | | 1/2003 | Kim et al. | |
| 6,553,439 B1 | * | 4/2003 | Greger et al. | 710/62 |
| 6,622,188 B1 | | 9/2003 | Goodwin et al. | |
| 6,625,124 B1 | * | 9/2003 | Fan et al. | 370/235 |
| 6,643,269 B1 | * | 11/2003 | Fan et al. | 370/254 |
| 6,717,956 B1 | * | 4/2004 | Fan et al. | 370/477 |
| 6,779,046 B1 | * | 8/2004 | Osuga | 710/14 |
| 6,842,806 B2 | * | 1/2005 | Ervin | 710/110 |
| 2003/0126413 A1 | * | 7/2003 | El-Kik et al. | 712/225 |

(Continued)

FOREIGN PATENT DOCUMENTS

WO    WO 2097642 A1  *  12/2002

OTHER PUBLICATIONS 16K 12C Serial EEPROM (24AA16/24LC16B) from Microchip Technology Inc., 2002.*

(Continued)

*Primary Examiner*—Khanh Dang
(74) *Attorney, Agent, or Firm*—Synnestvedt & Lechner LLP

(57) ABSTRACT

A method and apparatus implementing an enhanced protocol between an I2C master and an I2C slave. In various embodiments the invention permits greater addressability space and high priority access to the slave device. The enhanced protocol is implemented by the addition of command code data being transmitted which is recognized through an interface circuit inside the slave device. The invention provides an I2C solution for accessing high priority address space with one command byte, medium priority space with two command bytes and low priority space with three command bytes.

19 Claims, 3 Drawing Sheets

U.S. PATENT DOCUMENTS

2004/0213274 A1* 10/2004 Fan et al. .................. 370/401
2005/0172064 A1* 8/2005 Krygier ........................ 711/4

OTHER PUBLICATIONS

I2C Facts from NXP founded by Philips Semiconductors, undated.*

PCA8581/PCA8581C 128×8 Bit EEPROM With I2C Bus Interface from Philips Semiconductors, Apr. 1997.*
The I2C Bus and How to Use It (Including Specifications), Philips Semiconductors, Apr. 1995.*
The I2 C-Bus Specification, Version 2.1, Jan. 2000, pp. 1-46.

* cited by examiner

FROM MASTER TO SLAVE

FROM SLAVE TO MASTER

A = ACKNOWLEDGE (SDATA LOW)
Ā = NOT ACKNOWLEDGE (SDATA HIGH)
S = START CONDITION
P = STOP CONDITION

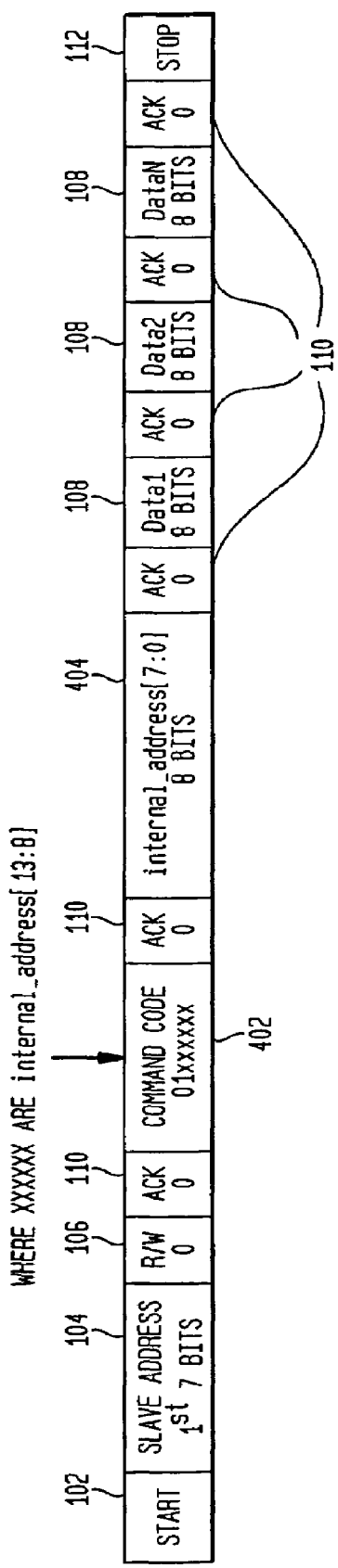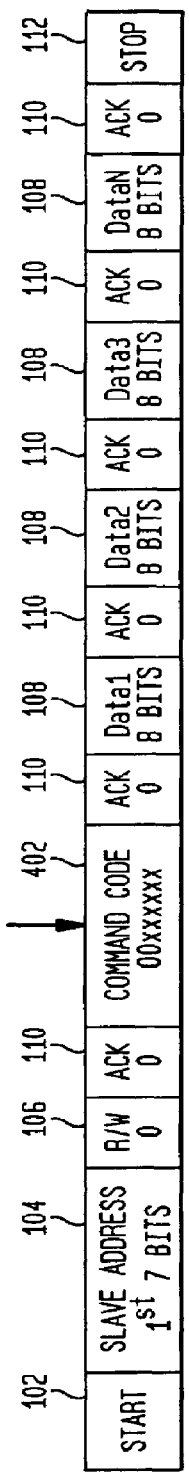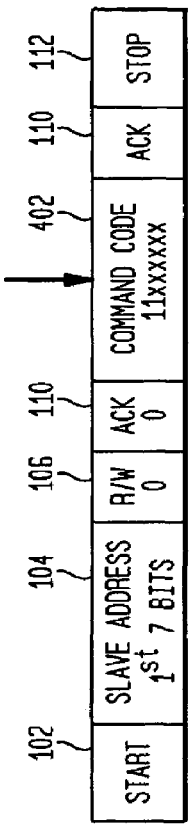

METHOD AND APPARATUS FOR PROVIDING AN INTER INTEGRATED CIRCUIT INTERFACE WITH AN EXPANDED ADDRESS RANGE AND EFFICIENT PRIORITY-BASED DATA THROUGHPUT

FIELD OF THE INVENTION

The present invention relates to Inter Integrated Circuit (I2C) interface addressing for communication between connected devices. In particular, the invention provides implementation of a larger address space. Additionally, the invention permits efficient high priority accesses.

BACKGROUND OF THE INVENTION

As is well known in the prior art, an I2C (Inter-IC) bus is a bi-directional two-wire serial bus that provides a communication link between devices connected to the bus. Devices are typically considered as masters or slaves when data transfers are being performed. The master is the device which initiates a data transfer on the bus and generates the clock signals to permit that transfer. At that time, any device addressed is considered a slave.

FIG. 1 illustrates the prior art, 7-bit protocol used in I2C bus communications. This protocol is fairly simple, with a five-part format comprising: 1) A start bit 102 to initiate a transaction, 2) an address byte, with seven bits 104 denoting the address of the slave device and the eighth bit 106 denoting a read or write command, 3) data bytes 108, 4) an acknowledge bit 110 following each 8-bit address or data byte, and 5) a stop bit 112 to terminate the transaction.

Not illustrated in FIG. 1 is another, prior art protocol that uses a 10-bit addressing protocol in which the slave address 104 has the format 11110XX (as before, the eighth bit of this information byte is a read/write indicator 106). The five high order bits indicate that 10-bit addressing protocol is being employed, while the remaining two bits are the two high order bits of the slave address. The remaining 8 bits of the 10-bit address are then provided in the first data byte 108.

Both these 7-bit and 10-bit prior art addressing protocols permit an additional data byte 108 to contain additional addressing information, such as an internal register address of the slave device.

Although widely used, the I2C bus suffers from several drawbacks, one of which is the limited addressability/time inefficiencies inherent in its protocol. Prior art attempts at remedying this problem have chiefly involved adding external pins to the slave device. While this method does permit the I2C master to control a larger word addressing space, it requires larger package pin counts for any I2C slave devices to be so addressed.

The current invention provides access to a large address space without requiring additional external pins on the device addressed. Further, the invention provides an interface that is efficient for high priority accesses.

SUMMARY OF THE INVENTION

This invention relates to an enhanced protocol between an I2C master device and an I2C slave device. In various embodiments, the invention permits greater addressable space and high priority access to the slave device. The enhanced protocol is implemented by the addition of command code data being transmitted immediately following the 7-bit slave address (+1 bit read/write indicator) used in the conventional 7-bit addressing protocol.

The addressed slave device would recognize the command code through an interface circuit inside the slave device. A large system, of which the master and slave are components, would be configured such that devices seeking to address that slave device would know to do so in the enhanced protocol format. Configuring of system components as to required communication protocols in this manner is well-known in the prior art.

Various embodiments of the invention permit alternative addressing schemes to be implemented by this command code structure. In particular, the invention provides an I2C solution for accessing high priority address space with one command byte, medium priority space with two command bytes and low priority space with three command bytes.

BRIEF DESCRIPTION OF THE DRAWINGS

Various embodiments of the present invention will now be described in detail in conjunction with the annexed drawings, in which:

FIG. 4 illustrates an exemplary write operation enhanced protocol for 14-bit addressing (low priority) according to an embodiment of the invention;

FIG. 5 illustrates an exemplary write operation enhanced protocol for 6-bit addressing (medium priority) according to an embodiment of the invention; and, FIG. 6 illustrates an exemplary write operation enhanced protocol for direct command (high priority) according to an embodiment of the invention.

DETAILED DESCRIPTION

Figure 2:
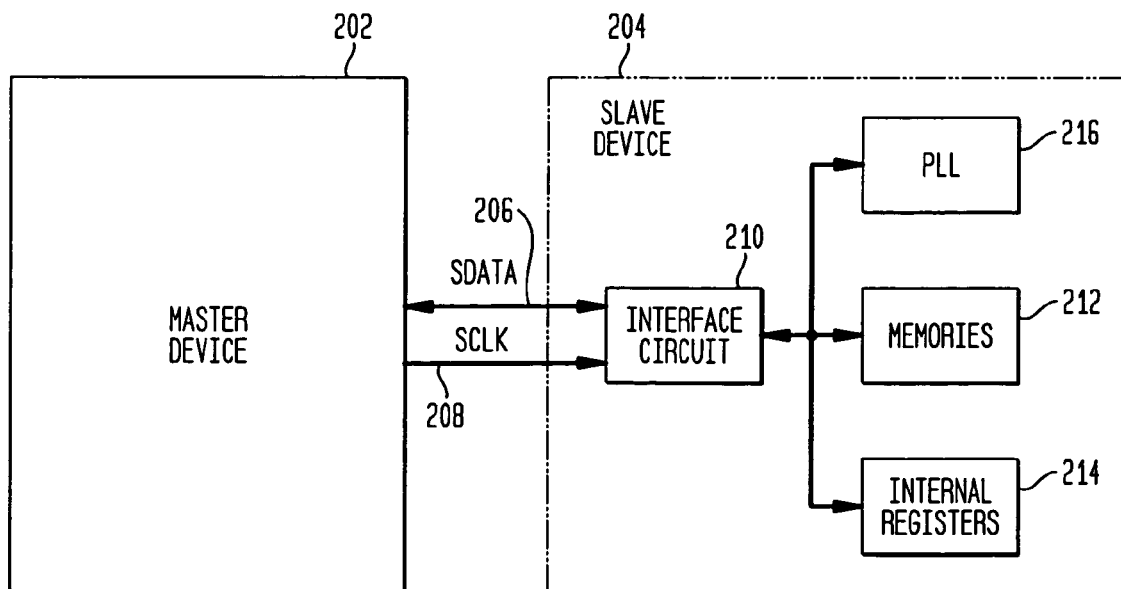
FIG. 2 illustrates a block diagram of an I2C bus structure connecting master and slave devices.

The present invention describes an enhanced priority access data protocol between an I2C master device and an I2C slave device. FIG. 2 illustrates an embodiment of the invention in which an I2C bus structure connects a master device 202 and a slave device 204. The two devices communicate through the data line, SDATA 206 and clock line, SCLK 208. As illustrated, and as is typical in the prior art, the master 202 provides the clock during the communication session while both devices, through the I2C standard protocol, drive data.

In this embodiment of the invention, an enhanced I2C protocol is implemented through an interface circuit 210 contained in the slave device. This interface circuit 210 not only communicates with the bus but with various internal memories 212, internal registers 214, and internal devices (e.g., PLL 216) of the slave device 204.

Figure 3:
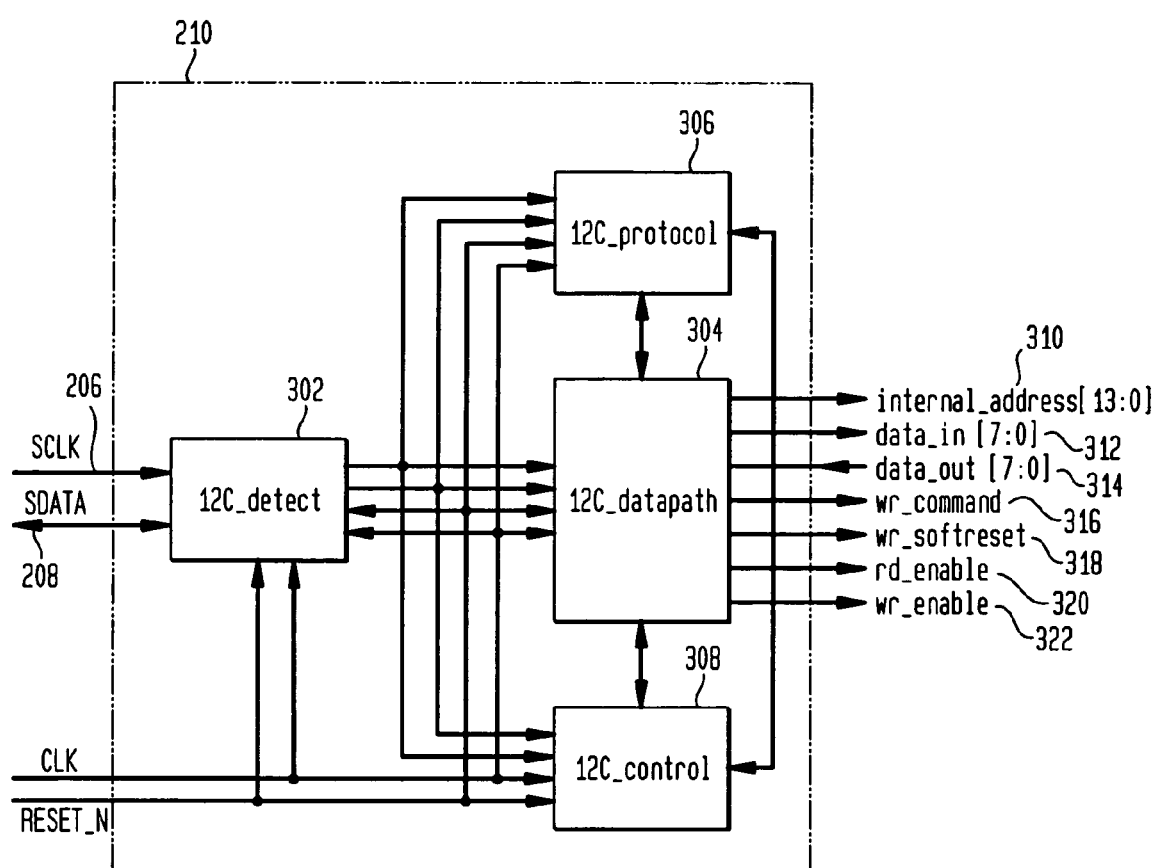
FIG. 3 illustrates an I2C interface circuit according to an embodiment of the invention.

FIG. 3 illustrates the interface circuit 210 in greater detail. As depicted, the interface circuit 210 consists of the following blocks: an I2C_detect block 302 to detect start and stop condition; an I2C_datapath block 304 to transfer data back and forth to internal registers, memories, and devices; an I2C_protocol block 306 to generate the transitions from one priority state to another and an I2C_control block 308 to generate the I2C control signals to the I2C_datapath block 304. As further depicted in FIG. 3, I2C_datapath block 304 communicates with the slave device through various signaling channels. Items 312 and 314 denote 8-bit data_in and 8-bit data_out channels, respectively. Items 320 and 322 denote read enable and write enable 1-bit signaling, respectively. The use of such signaling is well known in the prior art. In the illustrated embodiment, internal_address 310 is a 14 bit address. As shall be described below in greater detail, in the event the address protocol of the present invention does not utilize all 14 bits, the high order bits are simply padded with zeroes. FIG. 3 also depicts a wr_softreset signal line 318 and a wr-command bit signal 316 which are used in the protocol of the current invention to perform a direct command function. This function will be described in greater detail below in the discussion of FIG. 6.

Figure 1:
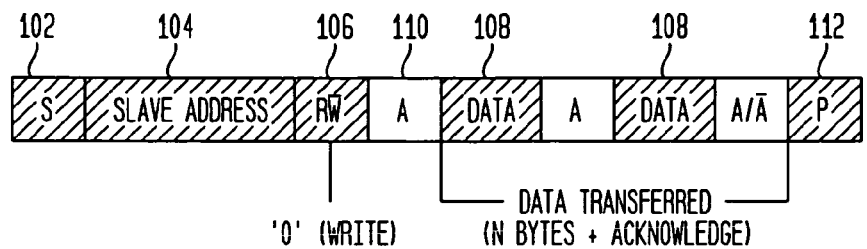
FIG. 1 illustrates the basic protocol in an I2C bus write operation in accordance with the prior art.
Figure 1:
Figure 1:

In an embodiment of the invention to be discussed now in greater detail, the enhanced protocol is implemented by augmenting the prior art I2C 7-bit addressing protocol illustrated in FIG. 1. This augmentation is implemented by the creation and transmission of a sequence or array of addressing parameters. In particular, an 8-bit command code is transmitted immediately following the slave address 104 and the R/W indicator 106. The low order 6 bits of this command code contain a supplemental address which will be used in addressing an internal location within the slave device. The first two bits of this command code are used to denote which of three addressing schemes of this embodiment of the invention are being implemented: (1) 14-bit addressing, (2) 6-bit addressing and (3) direct command access. These addressing schemes correspond to FIGS. 4, 5 and 6, respectively. Each will now be discussed in greater detail.

FIG. 4 illustrates an exemplary write operation using the enhanced protocol of this embodiment of the invention wherein low priority, 14 bit addressing is implemented. As shown in FIG. 4, after a START condition 102, a 7-bit slave address 104 is transmitted first, followed by an R/W indicator bit 106. As illustrated, the R/W indicator 106 is depicted as a "0", thereby signaling that a write operation is to occur. If the 7-bit address matches the slave address, the I2C_protocol_block 306 acknowledges the master device 202 with an ACK bit 110 set to "0". The signaling depicted in FIG. 4 that has been discussed to this point, matches the conventional I2C protocol depicted in FIG. 1.

As illustrated in FIG. 4, the master device 202 next transmits an 8-bit command code 402. The interface circuit 210 monitors the upper two bits [7:6] of this command code 402. As depicted in FIG. 4, the status of these two bits is "01", thereby indicating a 14-bit address format is being communicated. In this case, the supplemental address consists of the lower 6 bits [5:0] of the 8-bit command code 402 and represents the upper 6 bits [13:8] of the 14-bit address being transmitted. Referring to FIG. 2, this 14-bit address is used by the Interface Circuit 210 to access an internal address of the slave device, i.e., a memory address 212, and internal register 214 or a Phase Lock Loop (PLL) device 216.

Next, and as is conventional in I2C protocol, upon receipt of an 8-bit byte of information, an acknowledgment (ACK 110) is sent by the slave device 204. The interface circuit 210 then receives the additional byte of address information— the lower 8 bits [7:0] of the 14-bit internal address. As before, an ACK 110 signal is sent to acknowledge receipt of this byte of information. Communication then occurs in accordance with conventional I2C protocol. That is, the master device 202 starts writing data bytes 108 one byte at a time with the slave device 204 sending an ACK 110 indicator as they are received. As is well-known in the prior art, the word internal address registers or word internal memories are automatically incremented by one after each data byte transfer. Thus, by way of example, a write operation in which a plurality of data bytes is to be written to a slave device's internal memory requires only the address of a starting memory location need be supplied. Also as is well-known in the prior art, the slave device 204 will remain addressed until it receives a STOP condition 112.

FIG. 5 illustrates an exemplary write operation according to this embodiment of the invention when the upper two bits [7:6] of the 8-bit command code 402 have a "00" status. This indicates that a 6-bit address format is being communicated, wherein the supplemental address, consisting of the lower 6 bits [5:0] of the command code 402, is the 6-bit internal address. As in FIG. 4, the slave interface circuit 210 will generate an ACK 110 in the $9^{th}$ bit position indicating to the master device 102 that the byte of information 402 has been received. The I2C_protocol block 306 within the interface circuit 210 will have recognized that the next byte of information to be received will be data (as opposed to additional address information as in the example depicted in FIG. 4). Accordingly, it will cause the I2C_control block 308 and the I2C_datapath block 304 to timely transition to the appropriate state to receive this data byte (and any subsequent data bytes) transmitted from the master device. As before, the word internal address registers are automatically incremented by one after each data byte 108 transfer. Also as before, the slave will remain addressed until it receives a STOP condition 112.

Both the 14-bit address illustrated in FIG. 4 and the 6-bit address illustrated in FIG. 5 represent an internal address of registers or internal memories of the slave device 204 being addressed. In a further embodiment of the invention (not illustrated), the interface circuit 210 would process these separate protocol formats in a similar manner as if both contained a 14-bit address. That is, upon recognizing a "00" command (indicating a 6-bit address is being transmitted), the interface circuit 210 would set each of the upper bits [13,6] of the internal address to "0" and then employ the same internal 14-bit addressing algorithm in the slave device 204. Thus, as illustrated in FIG. 3, internal_address 310 would be represented as a 14-bit address regardless of which addressing scheme was used in the protocol.

The enhanced protocol also can be used to support a high priority write operation to selected registers contained in the slave device, as illustrated in FIG. 6. Specifically, when the upper two bits [7:6] of the 8 bit command are set to "11", this may indicate to the interface circuit that the communication is a direct command access. In such a case, the lower 6 bits [5:0] of the 8-bit command code 402 are encoded to perform a write of predefined data to one of the selected registers. That is, this portion of the command code contains an address associated with a register in the slave device, which address, when accessed, will cause the loading of predetermined data into that register via a hard-coded internal write operation.

This high priority write operation would speed up writing data to selected registers or devices inside the slave device. An example of a useful application of this feature would be the resetting of a specific device contained in the slave device. In particular, the feature would enable selection of different frequency ranges of a PLL inside the slave device or switching of an internal multiplexing clock. Implementation of these examples is attained in an embodiment of the invention in which the command code 402 contains the low order 6 bits as indicated in Table 1:

TABLE 1

Direct Command Bits[5:0] Encoding

| Bits[5:0] | Description |
| --- | --- |
| 000000 | Select frequency range 0 |
| 000001 | Select frequency range 1 |
| 000010 | Select frequency range 2 |
| 000011 | Select frequency range 3 |
| 000100 | Select frequency range 4 |
| 000101 | Select frequency range 5 |
| 000110 | Switch to Crystal clock |
| 000111 | Switch to PLL clock |
| 001000 | Softreset command |
| 001001–111111 | Reserved |

It will be understood that the forgoing description of the invention is by way of example only, and variations will be evident to those skilled in the art without departing from the scope of the invention, which is as set out in the appended claims.

What is claimed is:

1. A method for a master device to communicate with a slave device connected to said master device via an inter-integrated circuit bus (I2C bus); said method comprising the steps of:
    generating an array of addressing parameters comprising an address of said slave device followed by a command code comprising at least one indicator bit indicating the format of an internal address portion of the array, and at least a portion of said internal address followed by at least one array entry corresponding to said internal address;
    wherein said at least one indicator bit is in either a first state or a second state;
        when said at least one indicator bit is in said first state, utilizing some of the command code as part of said internal address, and utilizing an additional portion of said array as the remainder of said internal address; and
        when said at least one indicator bit is in said second state, utilizing some of the command code as all of said internal address; and transmitting said array over said I2C bus.

2. The method of claim 1 wherein said communication is selected from the group consisting of writing data to a location within said slave device and reading data from a location within said slave device and wherein, when said communication is a writing, said method further comprising the step of transmitting data over said I2C bus.

3. The method of claim 1 wherein;
    said command code comprises 8 bits;
    the at least one indicator bit comprises the 2 high order bits of said command code;
    when said 2 high order bits are in said first state, the 6 low order bits of said command code comprise part of a 14-bit internal address, and an additional 8 bits of data in said array comprise the remainder of the 14-bit internal address; and
    when said 2 high order bits are in said second state, the 6 low order bits of said command code comprise all of a 6-bit internal address.

4. The method of claim 3 wherein;
    said 2 high order bits of said command code have a third state; and
    when said 2 high order bits are in said third state, the 6 low order bits of said command code comprises an internal address associated with a particular register in said slave device that, when accessed, will cause the loading of predetermined data into said register via a hard-coded internal write operation.

5. A method for communicating between a master device and a slave device connected via an inter-integrated circuit bus (I2C bus), said slave device comprising at least one internal device having an internal address, said method comprising the steps of:
    sending a message from said master device to said slave device over said I2C bus;
    said message comprising a command code to said addressed slave device, said command code comprising 8 bits, a 2-bit subset of said 8 bits functioning as an indicator of a type of supplemental address that is being provided, wherein a particular state of said 2-bit indicator indicates that the supplemental address contains 6 bits of a 14-bit internal address that is being provided;
    said slave device determining whether the 2-bit indicator is in said particular state, and, if said 2-bit indicator is in said particular state, said slave device utilizing the 6 low order bits of the command code as part of the 14-bit internal address and an additional 8 bits of data as the remainder of the 14-bit internal address.

6. The method of claim 5 wherein said communicating is selected from the group consisting of writing data to a location within said slave device and reading data from a location within said slave device.

7. A method for communicating between a master device and a slave device connected via an inter-integrated circuit bus (I2C bus), said slave device comprising at least one internal device having an internal address, said method comprising the steps of:
    sending a message from said master device to said slave device over said I2C bus;
    said message comprising a command code to said addressed slave device, said command code comprising 8 bits, a 2-bit subset of said 8 bits functioning as an indicator of a type of supplemental address that is being provided, wherein a particular state of said 2-bit indicator indicates that the supplemental address contains 6 bits of a 6-bit internal address that is being provided:
    said slave device determining whether the 2-bit indicator is in said particular state, and, if said 2-bit indicator is in said particular state, said slave device utilizing the 6 low order bits of the command code as the 6-bit internal address.

8. The method of claim 7 wherein said communicating is selected from the group consisting of writing data to a location within said slave device and reading data from a location within said slave device.

9. The method of claim 7 wherein said communicating comprises a write operation being performed from said master device to said slave device, said method further comprising the steps of:
    transitioning to a receive state responsive to receipt of said command code;
    receiving data transmitted from said master device; and,
    writing said data to the slave device at a location therein identified by said 6-bit internal address.

10. A method for communicating between a master device and a slave device connected via an inter-integrated circuit bus (I2C bus), said slave device comprising at least one internal device having an internal address, said method comprising the steps of:
    sending a message from said master device to said slave device over said I2C bus;

said message comprising a command code to said addressed slave device, said command code comprising 8 bits, a 2-bit subset of said 8bits functioning as an indicator of a type of supplemental address that is being provided, wherein a particular state of said 2-bit indicator indicates that a direct write operation of data is being performed to a particular register in the slave device;

said slave device, responsive to said 2-bit indicator being in said particular state, parsing the 6 low order bits of the command code to obtain said internal address which, when accessed, will cause the loading of predetermined data into said register via a hard-coded internal write operation.

11. The method of claim 10 wherein said communicating is selected from the group consisting of writing data to a location within said slave device and reading data from a location within said slave device.

12. A method for communicating between a master device and a slave device connected via an inter-integrated circuit bus (I2C bus), said slave device comprising at least one internal device having an internal address, said method comprising the steps of:

sending a message from said master device to said slave device over said I2C bus;

said message comprising a command code to said addressed slave device, said command code comprising 8bits, a 2-bit subset of said 8 bits functioning as an indicator of a type of supplemental address that is being provided, wherein said 2-bit indicator being in a first state indicates that one of a 6-bit supplemental address that is used as part of a communicated 14-bit internal address is being provided and said 2-bit indicator being in a second state indicates that a 6-bit supplemental address that is used as a 6-bit internal address is being provided;

said slave device interpreting said supplemental address contained in said command code in accordance with said state of said two bit indicator; and said slave device determining an internal address for said slave device using said supplemental address.

13. The method of claim 12 wherein said communicating is selected from the group consisting of writing data to a location within said slave device and reading data from a location within said slave device.

14. A method for communicating between a master device and a slave device connected via an inter-integrated circuit bus (I2C bus), said slave device comprising at least one internal device having an internal address, said method comprising the steps of:

sending a message from said master device to said slave device over said I2C bus;

said message comprising a command code to said addressed slave device, said command code comprising 8 bits, a 2-bit subset of said 8bits functioning as an indicator of a type of supplemental address that is being provided, wherein said 2-bit indicator being in a first state indicates that a 6-bit supplemental address that is used as part of a communicated 14-bit internal address is being provided and said 2-bit indicator being in a second state indicates that a 6-bit supplemental address that is used as a 6-bit internal address for a direct command access operation is being provided;

said slave device interpreting said supplemental address contained in said command code in accordance with said state of said two bit indicator; and said slave device determining an internal address for said slave device using said supplemental address.

15. The method of claim 14 wherein said communicating is selected from the group consisting of writing data to a location within said slave device and reading data from a location within said slave device.

16. A method for communicating between a master device and a slave device connected via an inter-integrated circuit bus (I2C bus), said slave device comprising at least one internal device having an internal address, said method comprising the steps of:

sending a message from said master device to said slave device over said I2C bus;

said message comprising a command code to said addressed slave device, said command code comprising 8 bits, a 2-bit subset of said 8 bits functioning as an indicator of a type of supplemental address that is being provided, wherein said 2-bit indicator being in a first state indicates that a 6-bit supplemental address that is used as a 6-bit internal address is being provided and said 2-bit indicator being in a second state indicates that a 6-bit supplemental address that is used as a 6-bit internal address for a direct command access operation is being provided;

said slave device interpreting said supplemental address contained in said command code in accordance with said state of said two bit indicator; and said slave device determining an internal address for said slave device using said supplemental address.

17. The method of claim 16 wherein said communicating is selected from the group consisting of writing data to a location within said slave device and reading data from a location within said slave device.

18. A method for communicating between a master device and a slave device connected via an inter-integrated circuit bus (I2C bus), said slave device comprising at least one internal device having an internal address, said method comprising the steps of:

sending a message from said master device to said slave device over said I2C bus;

said message comprising a command code to said addressed slave device, said command code comprising 8 bits, a 2-bit subset of said 8 bits functioning as an indicator of a type of supplemental address that is being provided, wherein said 2-bit indicator being in a first state indicates that a 6-bit supplemental address that is used as part of a communicated 14-bit internal address is being provided, said 2-bit indicator being in a second state indicates that a 6-bit supplemental address that is used as a 6-bit internal address is being provided, and said 2-bit indicator being in a third state indicates that a 6-bit supplemental address that is used as a 6-bit internal address for a direct command access operation is being provided;

said slave device interpreting said supplemental address contained in said command code in accordance with said state of said two bit indicator; and said slave device determining an internal address for said slave device using said supplemental address.

19. The method of claim 18 wherein said communicating is selected from the group consisting of writing data to a location within said slave device and reading data from a location within said slave device.

* * * * *